United States Patent [19]

Mroz

[11] Patent Number: 4,624,355
[45] Date of Patent: Nov. 25, 1986

[54] HYDRAULIC CLUTCH AND PUMP ASSEMBLY

[76] Inventor: Joseph Mroz, 2584 Montgomery Street, Montreal, Canada, H2K 2S4

[21] Appl. No.: 614,549

[22] Filed: May 29, 1984

Related U.S. Application Data

[63] Continuation-in-part of Ser. No. 405,945, Aug. 6, 1982, abandoned.

[51] Int. Cl.⁴ .................. F16D 25/04; F16D 25/12
[52] U.S. Cl. .................... 192/85 AA; 192/88 A
[58] Field of Search .............. 192/85 AA, 57, 88 A; 417/229, 313; 418/166, 181

[56] References Cited

U.S. PATENT DOCUMENTS

| | | | |
|---|---|---|---|
| 574,269 | 12/1896 | Richards | 192/88 A |
| 1,805,081 | 5/1931 | Drkal | 192/85 AA |
| 2,153,372 | 4/1939 | Hyde | 192/85 AA |
| 2,178,050 | 10/1939 | Peterson | 192/85 AA X |
| 2,382,570 | 8/1945 | Kraft | 192/88 A X |
| 2,435,368 | 2/1948 | Sadler | 192/85 AA |
| 2,771,976 | 11/1956 | Smirl | 192/85 AA |
| 2,868,342 | 1/1959 | Croucher | 192/85 AA X |
| 2,956,659 | 10/1960 | Grant | 192/88 A X |
| 3,157,057 | 11/1964 | Palmer et al. | 192/88 A X |
| 3,184,023 | 5/1965 | Hovde | 192/88 A X |

FOREIGN PATENT DOCUMENTS

| | | | |
|---|---|---|---|
| 377083 | 6/1923 | Fed. Rep. of Germany | 192/85 AA |
| 1088292 | 9/1960 | Fed. Rep. of Germany | 192/85 AA |
| 1285845 | 1/1962 | France | 192/85 AA |

Primary Examiner—Rodney H. Bonck

[57] ABSTRACT

This hydraulic clutch is particularly adapted for heavy duty use and is characterized by its doing away with the need for a seal at the clutch shoes and for a rotary seal, at its connection with a supply pump, by provision of an elastic bag for containing the pressurized liquid acting against the clutch shoes and by rotation of the hydraulic liquid supply reservoir and pump with the input shaft of the clutch. The clutch can therefore operate at high hydraulic pressure. This hydraulic clutch and pump assembly comprises a fixed body portion, an input shaft rotatably carried by the fixed body portion, a hydraulic liquid reservoir bodily rotatable with the input shaft, an output shaft bodily rotatable with a clutch disk mounted on it, clutch shoes rotatable with the input shaft and axially displaceable into clutching engagement with the clutch disk in response to fluid pressure applied in the elastic bag against them, a pump bodily rotatable with the input shaft, and a valve and control to selectively provide pressurized fluid operatively within the bag.

5 Claims, 6 Drawing Figures

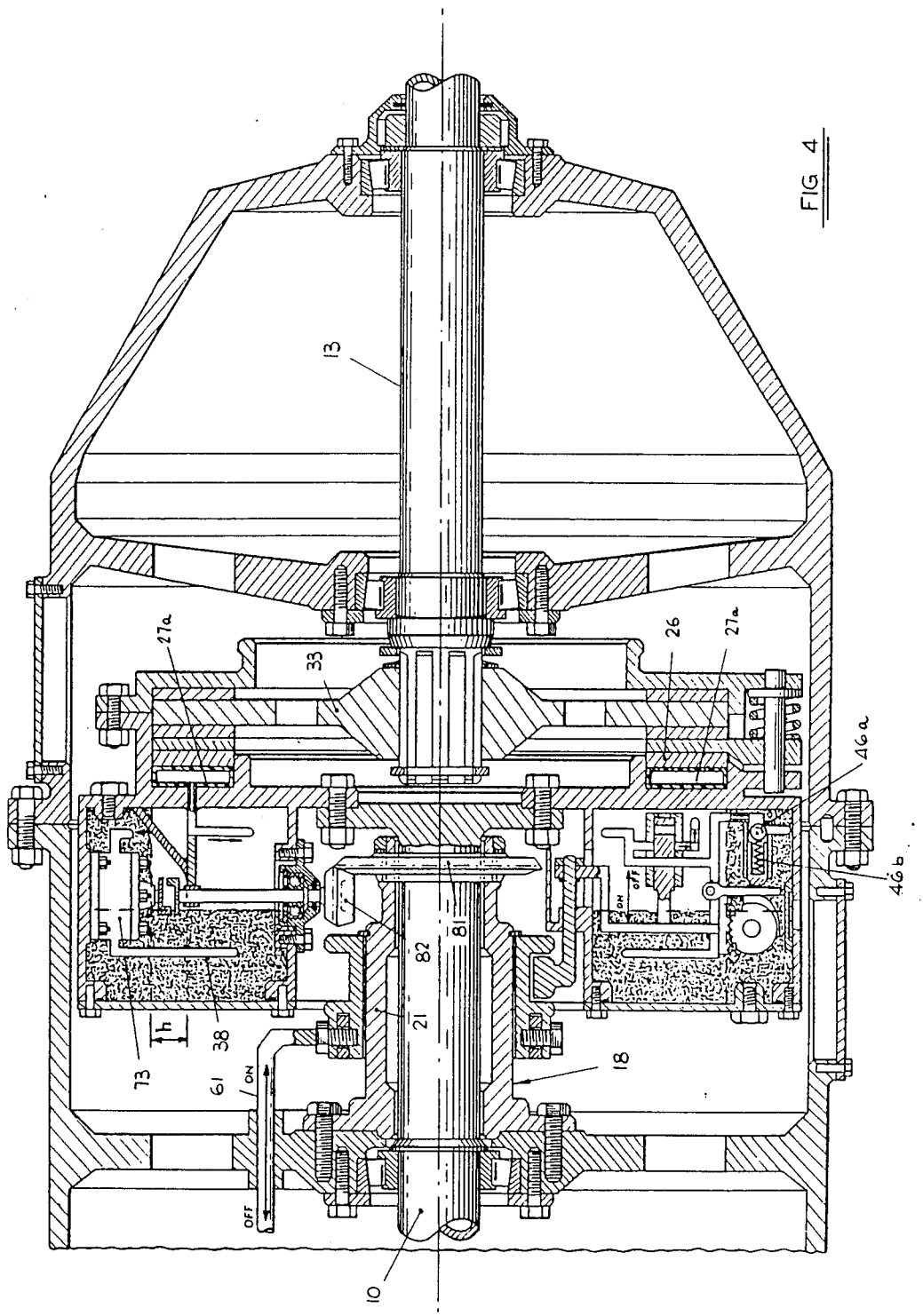

HYDRAULIC CLUTCH AND PUMP ASSEMBLY

This is a continuation-in-part application of original application Ser. No. 405,945 filed on Aug. 6, 1982 and now abandoned.

FIELD OF THE INVENTION

This invention relates to a hydraulic clutch and pump assembly, in particular of the type used for heavy duty operation.

DESCRIPTION OF THE PRIOR ART

In the hydraulic clutch and pump assembly of the type that has been used so far, the clutch and pump are separate units and this calls for some fluid coupling including a rotary seal to supply the hydraulic fluid under pressure to the clutch. Such seals often leak unless the operating pressure is low. In some prior art patents, the pump rotates with the clutch doing away with the need of a rotary seal but clutch seals are still required, again necessitating a rotatively low operating pressure.

SUMMARY OF THE INVENTION

It is a general object of the present invention to dispense with the need of rotary and clutch seals in a clutch and pump assembly of the above type.

It is an object of the present invention to provide a hydraulic clutch and pump assembly of the above type, which can operate at very high hydraulic pressure whereby the clutching surface areas can be decreased for a given clutching torque.

It is another object of the present invention to provide a hydraulic clutch and pump assembly which is of simple construction, using a relatively small number of parts.

BRIEF DESCRIPTION OF THE DRAWINGS

The above and other objects and advantages of the present invention will be better understood with reference to the following detailed description of preferred embodiments thereof which are illustrated, by way of examples, in the accompanying drawings, in which:

FIG. 4 is a view as in FIGS. 1 and 3 but of a third embodiment featuring a rotary pump driven by gears.

DETAILED DESCRIPTION OF PREFERRED EMBODIMENTS

Figure 1:
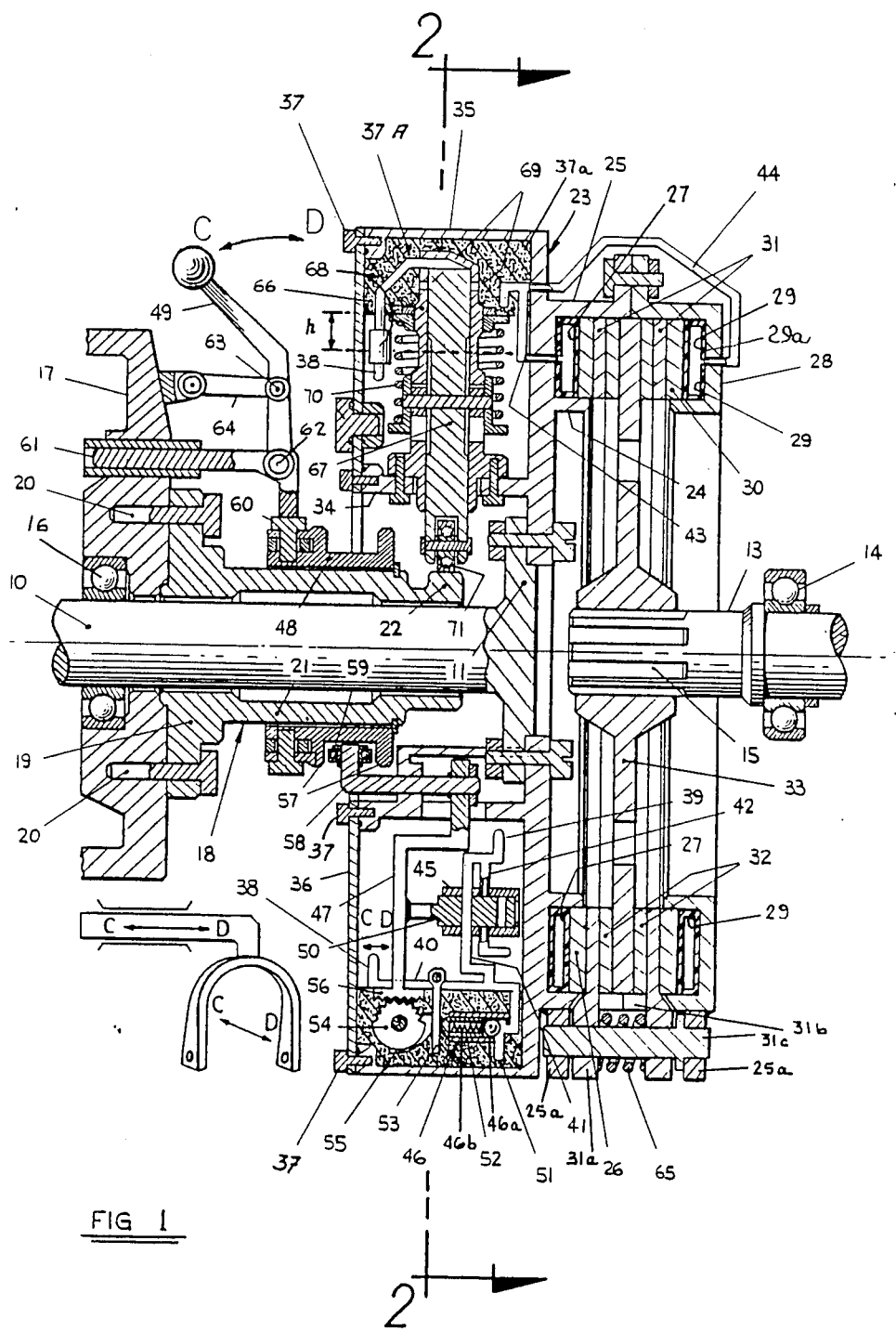
FIG. 1 is a cross-sectional view in an axial plane of a hydraulic clutch and pump assembly according to a first embodiment of the present invention embodying a reciprocating pump.

In the following detailed description, the same elements are identified by the same reference numerals throughout all the embodiments.

The hydraulic clutch and pump assembly, illustrated in FIG. 1, comprises an input or driving shaft 10 formed with an annular flange 11 at its outer end. An output shaft 13 is rotatively carried in any suitable body by ball bearings 14 and is axially aligned endwise with the input shaft 10. The end of the output shaft 13 adjoining the end of the input shaft 10 is formed with a splined portion 15.

Ball bearings 16 rotatively carry the input shaft 10 in a fixed body of which a portion only is shown. That fixed body portion includes the annular end portion 17 of a casing, not otherwise shown. A sleeve member 18 is engaged around the input shaft 10 with the latter freely rotating in it. The sleeve member 18 includes an annular flange 19 to fixedly attach the sleeve member 18 endwise against the annular end portion 17 by screws 20. The sleeve member 18 includes a cylindrical sleeve portion 21 intermediate the flange 19 and the opposite end forming a pump actuation portion or cam 22.

A ring is secured to the flange 11 of the input shaft 10 and includes a main ring member 23 having its inner edge bolted to the flange 11. The ring member 23 is formed, on one side with cylindrical projections 24 and 25 cooperatively forming an annular recess constructed and arranged for axial sliding of an annular pad 26 in it and to cooperatively define with it an annular chamber 27. A ring member 28 is secured to the cylindrical projections 24 and 25, and similarly defines an annular chamber 29 in cooperation with an annular axially slidable pad 30. The pads 26 and 30 are each fixed to one side of an annular clutch plate 31, while an annular clutch lining 32 of any appropriate material, including asbestos and metal, is secured to the other side of clutch plate 31. The linings 32 are arranged to be pressed against the opposite faces of a clutch disk 33. The latter is engaged on the splined portion 15 of the output shaft 13 to bodily rotate with it.

As shown at the bottom of FIG. 1, the two clutch plates 31 have circumferentially spaced ears 31a which extend radially through circumferentially spaced apertures 31b of cylindrical projection 25. Radial ears 25a are fixed to cylindrical projections 25 in register with ears 31a. A pin or bolt 31c extends through openings of ears 31a, 25a and permits axial movement of clutch plates 31 while preventing their rotation. A compression coil spring 65 surrounds bolt 31c between ears 31a and urges the two cluch plates 31 apart into declutched position. Hydraulic liquid under pressure is fed in chambers 27, 29 to apply uniform pressure to annular plates 26, 30 to effect clutching.

Figure 1A:
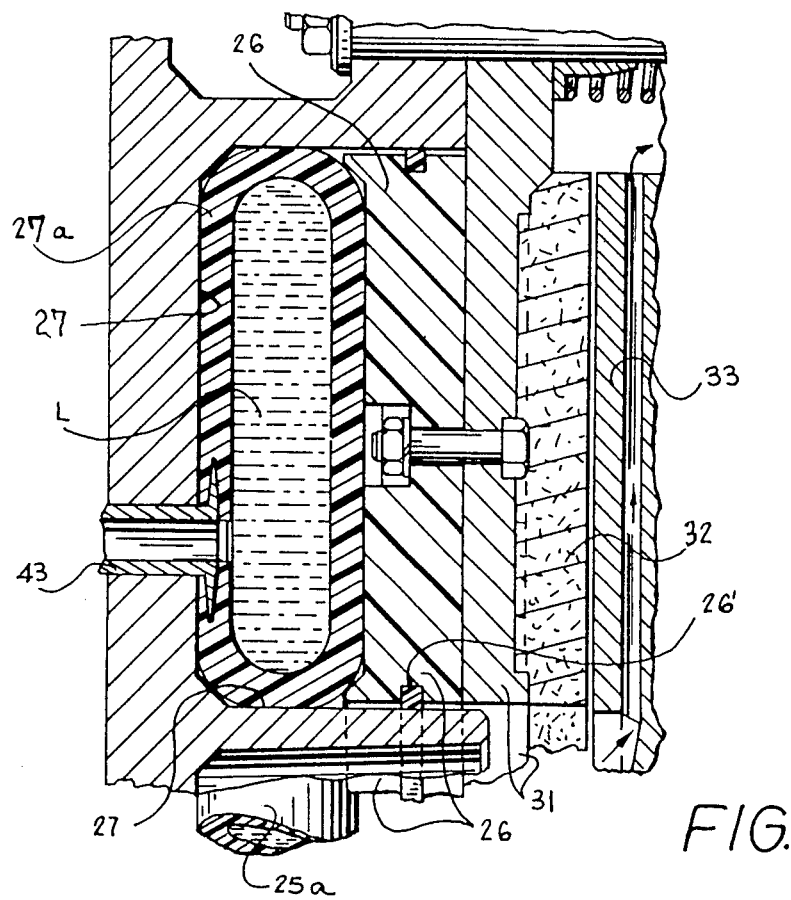
FIG. 1a and FIG. 1b are cross-sections on an enlarged scale, of parts of FIG. 1.
Figure 1B:
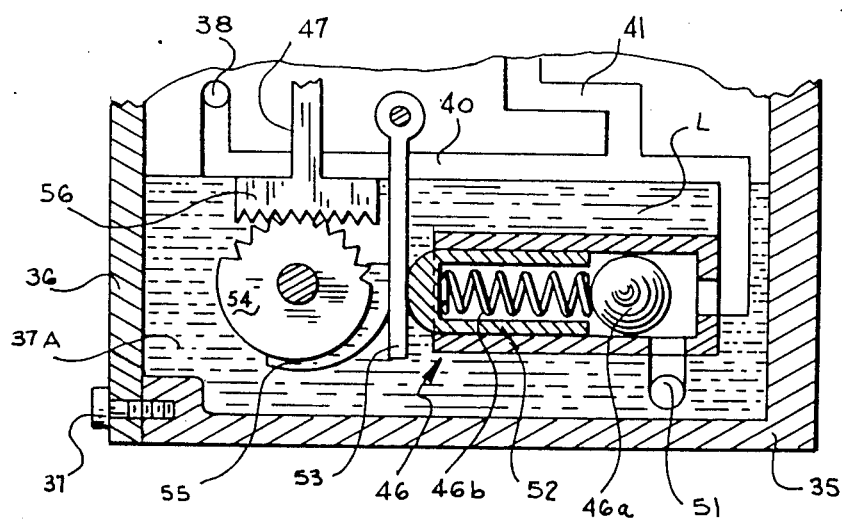
Figure 2:
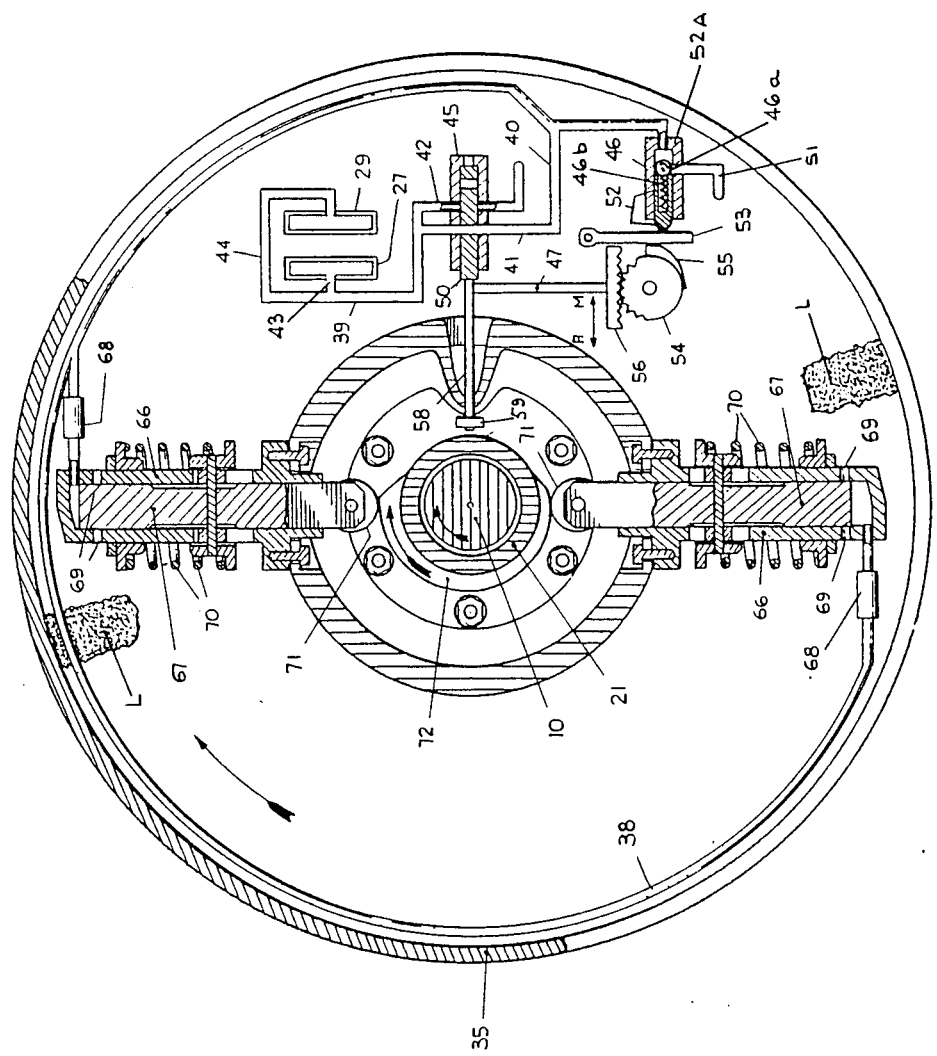
FIG. 2 is a transverse cross-section of the hydraulic clutch and pump assembly of FIG. 1 and taken along line 2—2 of FIG. 1.

According to an essential feature of the present invention, the liquid is not fed directly in chambers 27, 29 but in elastic, flexible annular tubes or bags 27a, 29a as more clearly seen in FIG. 1a. These bags 27a, 29a are made of rubber or suitable elastic and flexible synthetic material. They permit application of very high pressure (100 atmospheres or more) while positively preventing any liquid leak onto the clutching surfaces of disk 33 and clutch shoes 32. Due to the high pressure attainable, clutch shoes 32 can be eliminated and a direct metal to metal clutching contact obtained between disk 33 and both clutch plates 31.

The main ring member 23 is formed on its opposite side relative to the cylindrical projections 24 and 25 with another pair of cylindrical projections 34 and 35. An annular cover 36 is secured by screws 37 against the outer edge of the cylindrical projections 34 and 35. An annular reservoir 37A is provided for the hydraulic liquid inward of the cylindrical projection 35 of the ring 23. The liquid L in reservoir 37A is normally held uniformly distributed by centrifugal force, the letter h indicating the preferred range of minimum and maximum depth of liquid. Hydraulic fluid lines are formed in the ring 23 and fixedly connected to it to selectively supply hydraulic liquid under pressure in the annular bags 27a and 29a or to relieve the pressure. Those hydraulic fluid lines include a pressure fluid line 38 extending circularly in the ring 23 and parallel connected to the outlet of two hydraulic pumps 66, 67 (to be described hereinafter) through check valves 68. The circular fluid line 38 is connected by a transverse line 40 to a branch 41 connected at its other end to a hydraulic fluid line 39 which is connected to bags 27a, 29a by lines 43, 44. Another line 42 connects the line 39 to the annular reservoir 37A.

A control is provided to selectively allow hydraulic fluid under pressure to apply the clutch shoes against the clutch disk. That control comprises a slide valve 45, an adjustable pressure relief valve 46, a valve actuator arm 47, an axially-slidable control sleeve 48, and a manual actuator lever 49. The slide vale 45 includes a slidable piston 50 which is fixedly connected to the valve actuator arm 47 to be displaced by the same. The sliding piston 50 is provided with a pair of transverse fluid passages arranged to selectively register wih one or the other of branches 41 and 42. The safety pressure relief valve 46 is connected to the outer end of the transverse fluid line 40 and drains at 51 into the reservoir 37a. The safety pressure relief valve 46 includes a piston 52, a ball 46a and a compression spring located within piston 52 and compressed between the head of piston 52 and ball 46a and biasing the ball 46a toward closing of the fluid inlet at one end of the valve and outwardly biasing the piston 52 toward the open opposite end of the valve and into engagement with one side of a freely-pivotable arm 53. A partially toothed wheel 54 is bodily rotatable with a cam 55 adjacent the arm 53 for operative engagement of the cam with the opposite side of the arm to pivotally adjust the latter and, thus, adjustably hold the piston 52 more or less inside the valve 46. Thus, when the cam 55 has its radially outermost end in engagement with the arm 53, the piston 52 is in its innermost position and the compression spring inside the valve is compressed to increase the pressure required to open the valve to reservoir 37A. The safety valve 46 remains closed up to a predetermined safe pressure beyond which the valve will open when a higher pressure is produced which occurs when the bags 27a, 29a are full and in clutching position. Therefore, the pumps 66, 67 continue to pump and the liquid is simply recirculated. A rack member 56 is fixed at the end of the valve actuator arm 47 and has its teeth meshing with the teeth of the partially-toothed wheel 54. The axially-slidable sleeve 48 is axially slidable on the sleeve portion 21 of the fixed body portion and is provided with axially-spaced-apart external flanges 57. A push pull member 58 is fixed at one end to the valve actuator arm 47 and is slidably carried by the cylindrical flange 34. The other end of the member 58 is bent radially inward and rotatively carries a roller 59 for rolling engagement of the latter against one or the other of the two axially-spaced-apart flanges 57. That arrangement allows rotation of the arm 47 and member 58, with the ring 23 bodily with the input shaft 10 relative to the control sleeve 48 and it also allows concurrent displacement of the sleeve 48, the member 58 and the arm 47 to actuate both valves 45 and 46. A ring 60 is attached to the sleeve member 48 and is fixedly secured to a member 61, which is slidable endwise in the annular end portion 17 in the axial direction of the input shaft 10. The manual actuator lever 49 is pivotally connected at 62 and 63 to the sliding member 61 and to a pivotable arm 64 attached to the fixed annular end portion 17. Thus, the lever 49 pivots about the axis at point 63 to slide the member 61, the ring 60, the sleeve 48, the arm 58, the arm 47, the piston 50 and the rack member 56, either forward or rearward. When the actuator lever 49 is pivoted to the C position, as shown in FIG. 1, the aforementioned elements are moved to the rearward position defining the clutch-engaging position. The lever 49 in the D position defines the forward position of those elements and the clutch-disengaging position.

In the clutch-engaging position, shown in FIG. 1, the hydraulic liquid pumped in the line 38 flows to the annular bags 27a and 29a through the transverse line 40, the branch 41, the line 39 and the lines 43 and 44. Excess liquid returns to the reservoir 37A only through valve 46 since the branch 42 is cut by the valve 45. In the clutch-disengaging position, not shown, the hydraulic fluid pumped in the line 38 flows into the transverse line 40 but cannot any more flow in the branch 41, since the latter is cut by the piston 50 of the valve 45 which is moved to instead open the branch 42. Since the valve actuator arm 47 has also moved the rack member 56 to the left, the wheel 54 has rotated the cam 55 that now has its least outwardly-projecting end in engagement with the arm 53. The piston 52 is thus outwardly relaxed and the reduced compression of the spring in the valve 46 allows the latter to open to drain the pumped hydraulic fluid through that valve in the reservoir. The fluid in the bags 27a and 29a is expelled under the bias of the return springs 65, through the branch 42 and the valve 45 into the reservoir.

In the embodiment of FIG. 1, the hydraulic fluid is pumped by a reciprocating pump including a cylinder body 66 and a piston 67 reciprocable endwise in the cylinder 66 in a radial direction relative to the input shaft 10. Fluid line 38 is connected to the closed outer end of the cylinder 66. Inlets 69 are provided in the outer end of the cylinder 66 to allow the entry of hydraulic fluid of the reservoir 37A into the cylinder. A spring 70 surrounds the reciprocating piston 67 and biases the same radially inwardly toward the cam 22. The latter is provided with a circumferential cam surface on and along which a roller 71 rides. The latter is mounted on the external end of the piston such that, upon rotation of the pump bodily with the ring 23 and the shaft 10, the piston 67 is reciprocated in reaction against the cam 22 upon displacement of the roller 71 along the cam surface.

Figure 3:
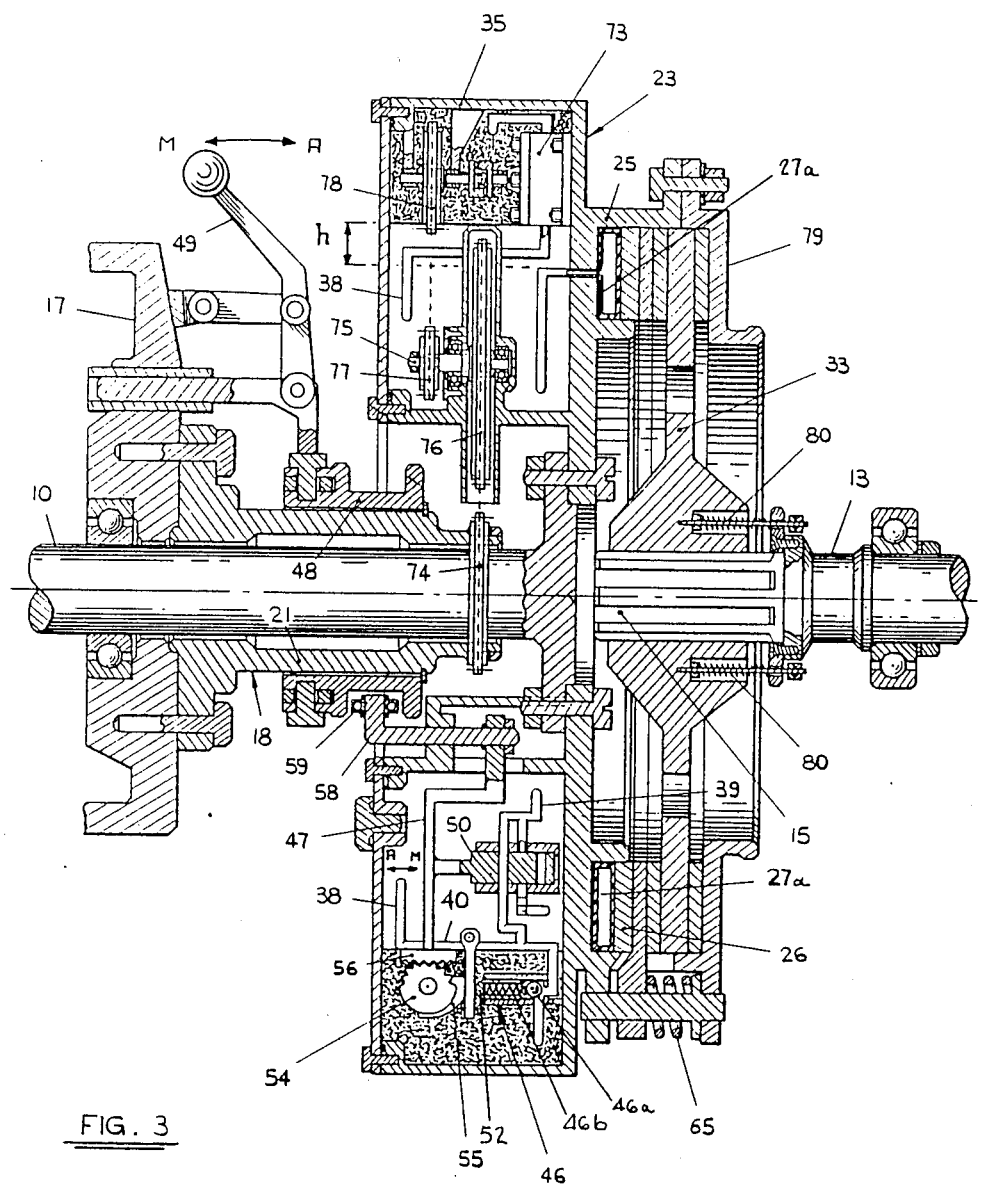
FIG. 3 is a view as in FIG. 1 but of a second embodiment featuring a rotary pump driven by a chain and sprocket drive.

The hydraulic clutch and pump assembly of FIG. 3 is the same as in the first preceding embodiment for most of the elements 10 to 65 inclusive, which have been described in detail with reference to FIG. 1. More specifically and as can be seen in FIG. 3, the second embodiment has a particular output shaft and clutch shoe arrangement and feaures a rotary pump 73 driven by a chain and sprocket drive.

The pump 73 is of any appropriate construction. A sprocket wheel 74 is provided on the outer end of the sleeve member 28 instead of the roller 71 riding on the cam 22, as in the first embodiment. An axle 75 is rotatably mounted and carried by the ring 23 parallel to the input shaft 10. A pair of axially spaced sprocket wheels 76, 77 are mounted on the axle 75 to rotate with it. A sprocket wheel 78 is coupled to the rotary pump 73 to rotate it. Chains, not shown, connect the sprocket wheel 74 to the sprocket wheel 76 and the sprocket wheel 77 to the sprocket wheel 78. Thus, when the ring 23 rotates around the sprocket 74, it rotates the sprocket wheels 76, 77, and 78 with it. This causes the chains to rotate the sprocket wheels 76, 77, and 78 and, thus, also the rotary pump 73.

In the second embodiment, only one clutch shoe 26 is used. The clutch disk 33 is axially pressed on its opposite side against the ring 79. Springs 80 are provided to move the clutch disk 33 axially away from the ring 79 when the pressure in the annular bag 27a is dropped to disengage the cluch.

The hydraulic clutch and pump assembly of FIG. 4 is the same as in the embodiment of FIG. 3, with the sole exception being that the rotary pump 73 is driven by gears rather than by a chain and sprocket assembly. For that purpose, a gear 82 is fixedly secured to the outer end of the sleeve member 21. A gear 82 meshes with the gear 81 and drives the rotary pump 73 upon rotation of the ring 23 around and relative to the gear 82.

Referring to FIG. 1a, it is noted that pad 26 is made of heat-insulating material and provided with a felt seal 26'. Seal 26' prevents ingress of dust or dirt into chamber 27, which might damage bag 27a. Pad 26 decreases heat transmission from the clutch to bag 27a.

What I claim is:

1. A hydraulic clutch and pump assembly comprising an input shaft and an output shaft rotatably mounted in end-to-end co-axial relation and for independent rotation one relative to the other, at least one clutch disc connected to the output shaft and bodily rotatable therewith, at least one clutch shoe bodily rotatable with the input shaft and axially displaceable relative thereto between a cluching position in engagement with said one clutch disc and declutching position out of engagement with said one clutch disc, biasing means biasing said clutch shoe to declutching position, a hydraulic fluid pump connected to the input shaft and bodily rotatable therewith, a fixed body portion rotatably carrying the input shaft and including a pump actuation member, the hydraulic fluid pump including a pumping member operatively actuated by the pump actuation member in response to bodily rotation of the pump with the input shaft relative to the fixed body portion, a cylindrical hydraulic fluid reservoir co-axial with said input shaft, a ring connected to the input shaft and carrying the reservoir, the pump, and said one clutch shoe for bodily displacement thereof with the input shaft, each clutch shoe cooperatively forming with said ring an annular chamber, an elastic flexible annular bag in said annular chamber, said pump having an inlet communicating with said reservoir, a hydraulic fluid line connecting the outlet of said pump to said bag, a control valve series connected in said fluid line intermediate said bag and said pump, an actuator moving said control valve between a first position in which the outlet of said pump is connected to said bag to move said clutch shoe to clutching position, and a second position in which the outlet of said pump is disconnected from said bag and said bag is drained into said reservoir in said declutching position of said clutch shoe, and a pressure relief valve having an inlet connected to said fluid line, and outlet connected to said reservoir and a compression spring compressed by said actuator in the first position of said control valve and released by said actuator in the second position of said control valve, whereby the pumped fluid can be returned to the reservoir under minimum back pressure in the declutching position of said clutch shoe.

2. A hydraulic clutch and pump assembly as defined in claim 1, wherein the pump actuation member includes a circular cam surface, and the pumping member includes a reciprocating piston, and a spring biasing the reciprocating piston in engagement with the circular cam surface for reciprocative pumping by said piston upon reciprocative displacement of the piston by the cam surface in response to rotation of the pump and the piston circularly along the circular cam surface.

3. A hydraulic clutch and pump assembly as defined in claim 1, wherein the pump actuation member includes a sprocket wheel fixedly secured around the input shaft, the hydraulic pump including a rotary pumping member and a sprocket and chain drive operatively connects the fixed sprocket wheel to the rotary pumping member for rotative pumping by the rotary pumping member upon rotative displacement of the sprocket and chain drive around and in engagement with the fixed sprocket wheel in response to rotation of the pump around the fixed sprocket wheel.

4. A hydraulic clutch and pump assembly as defined in claim 1, wherein the pump actuation member includes a gear fixedly secured around the input shaft, the hydraulic fluid pump including a rotary pumping member, and a gear drive operatively connects the fixed gear to the rotary pumping member for rotative pumping by the rotary pumping member upon rotation of the gear drive in response to rotation of the pump around the fixed gear.

5. A hydraulic clutch and pump assembly comprising an input shaft and an output shaft rotatably mounted in end-to-end co-axial relation and for independent rotation one relative to the other, at least one clutch disc connected to the output shaft and bodily rotatable therewith, at least one clutch shoe bodily rotatable with the input shaft and axially displaceable relative thereto between clutching and declutching positions relative to said one clutched disc, biasing means biasing said clutch shoe to declutching position, a hydraulic fluid pump connected to the input shaft and bodily rotatable therewith for continuous pumping action, a fixed body portion rotatably carrying the input shaft and including a pump actuation member, the hydraulic fluid pump including a pumping member operatively actuated by the pump actuation member in response to bodily rotation of the pump with the input shaft relative to the fixed body portion, a cylindrical hydraulic fluid reservoir surrounding said hydraulic fluid pump and bodily rotatable with the latter and with the input shaft and co-axial with said shafts, a ring connected to the input shaft and carrying the reservoir, the pump and said clutch shoe for bodily displacement thereof with the input shaft, each clutch shoe cooperatively forming with said ring an annular chamber, an elastic flexible annular bag in said annular chamber, hydraulic fluid lines connecting the outlet of said pump to said bag, hydraulic fluid freely contained in said reservoir, said pump having an inlet located for receiving said fluid, and control means on said hydraulic lines to selectively direct the pump supply of hydraulic fluid under pressure to said bag and to return the pump supply to said reservoir, whereby said hydraulic fluid remains uniformly distributed in said reservoir due to the centrifugal force produced by rotation of the reservoir, irrespective of the clutching and declutching positions of said clutch shoe, resulting in dynamic balance of said assembly in either said clutching and declutching positions.

* * * * *